United States Patent [19]

Albrecht et al.

[11] Patent Number: 5,526,372
[45] Date of Patent: Jun. 11, 1996

[54] HIGH ENERGY BURSTS FROM A SOLID STATE LASER OPERATED IN THE HEAT CAPACITY LIMITED REGIME

[75] Inventors: Georg Albrecht; E. Victor George, both of Livermore; William F. Krupke; Walter Sooy, both of Pleasanton; Steven B. Sutton, Manteca, all of Calif.

[73] Assignee: The United States of America as represented by the United States Department of Energy, Washington, D.C.

[21] Appl. No.: 286,372

[22] Filed: Aug. 5, 1994

[51] Int. Cl.[6] ...................................................... H01S 3/04
[52] U.S. Cl. .............................. 372/69; 372/70; 372/34; 372/35
[58] Field of Search ................................ 372/69, 70, 34, 372/35, 21, 31

[56] References Cited

U.S. PATENT DOCUMENTS

| | | | |
|---|---|---|---|
| 4,845,721 | 7/1989 | Hoffmann | 372/34 |
| 4,942,586 | 7/1990 | Lai | 372/68 |
| 4,945,544 | 7/1990 | Tanaka et al. | 372/69 |
| 4,951,294 | 8/1990 | Basu et al. | 372/21 |
| 5,022,043 | 6/1991 | Jacobs | 372/95 |
| 5,034,953 | 7/1991 | Sekiguchi | 372/34 |
| 5,077,750 | 12/1991 | Pocholle et al. | 372/68 |
| 5,077,751 | 12/1991 | Kudo et al. | 372/75 |
| 5,081,637 | 1/1992 | Fan et al. | 372/72 |
| 5,105,434 | 4/1992 | Krupke et al. | 372/69 |

*Primary Examiner*—Rodney B. Bovernick
*Assistant Examiner*—Yisun Dong
*Attorney, Agent, or Firm*—John P. Woolridge; Henry P. Sartorio; William R. Moser

[57] ABSTRACT

High energy bursts are produced from a solid state laser operated in a heat capacity limited regime. Instead of cooling the laser, the active medium is thermally well isolated. As a result, the active medium will heat up until it reaches some maximum acceptable temperature. The waste heat is stored in the active medium itself. Therefore, the amount of energy the laser can put out during operation is proportional to its mass, the heat capacity of the active medium, and the temperature difference over which it is being operated. The high energy burst capacity of a heat capacity operated solid state laser, together with the absence of a heavy, power consuming steady state cooling system for the active medium, will make a variety of applications possible. Alternately, cooling takes place during a separate sequence when the laser is not operating. Industrial applications include new material working processes.

14 Claims, 2 Drawing Sheets

HIGH ENERGY BURSTS FROM A SOLID STATE LASER OPERATED IN THE HEAT CAPACITY LIMITED REGIME

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to diode pumped solid state lasers. More specifically, it relates to the production of high energy bursts from a solid state laser operated in a heat capacity limited regime.

2. Description of Related Art

Solid state laser technology is a very well developed field and numerous embodiments and modes of operation have been demonstrated. A more recent development has been the pumping of a solid state laser active medium with an array of diode lasers (diode pumping, for short). These diode pump packages have previously been developed to pump solid state lasers with good efficiency, but low average power.

Developments at Lawrence Livermore National Laboratory (LLNL), particularly with respect to diode cooler technology, have extended diode pumping to the regime of high average power operation. One of the key limitations in power performance levels in solid-state lasers is the waste heat deposited in the active medium during the lasing process. Removing this waste heat in steady state operation creates thermo-mechanical stresses which must be maintained at appropriate levels to avoid fracture of the lasing medium. In the case of slab geometries (both Brewstee slab as well as Zigzag slab), these critical tensile stresses are on the large flat faces which are not amenable to available strengthening approaches. This stress fracture limitation has limited the average powers available from solid state lasers to a level where a variety of military applications are out of reach if approached using this conventional steady-state technology.

U.S. Pat. No. 5,034,953 is directed to a laser device which achieves a uniform temperature distribution within a slab-shaped medium by reciprocating the slab-shaped laser medium relative to the excitation member. U.S. Pat. No. 5,022,043 is directed to a high power diode pumped solid state laser with an unstable resonator. This laser uses a bundled end of light transmitting fibers to provide a high powered pump. U.S. Pat. No. 4,952,586 discloses a high power diode pumped laser using a low power control beam pumped into a laser medium excited by laser diodes.

U.S. Pat. No. 4,951,294 is directed to a diode pumped mode-locked solid state laser. U.S. Pat. No. 5,077,750 discloses a high power laser that is a combination of multiple amplified beams. U.S. Pat. No. 5,077,751 is directed to a high output laser which optically couples multiple laser beams. U.S. Pat. No. 5,081,637 is directed to a high power laser which uses collimated multiple diode laser pumps.

SUMMARY OF THE INVENTION

It is an object of the present invention to provide high energy bursts from a solid state laser operated in a heat capacity limited regime.

The invention is a method and apparatus for operation of a solid state laser in the heat capacity limited regime. Instead of cooling the laser, as one would do in steady state operation, in the heat capacity mode the laser operation is broken into two discrete and separate processes. During lasing the active medium is thermally well insulated and no cooling is present. Cooling takes place during a separate sequence when the laser is not operating. In heat capacity operation, as lasing proceeds, the active medium will heat up until it reaches some maximum acceptable temperature. The waste heat is stored in the active medium itself. One of the key features of this heat capacity approach is the inversion of the temperature profile through the medium as compared to conditions where the laser is actively cooled while lasing takes place. For example, consider a slab geometry and focus on the stress conditions on the large slab faces. It is the stress on the surfaces, where defects may be present, that limits laser performance levels. In the heat capacity mode, the slab is hotter on the surface than in the center, thereby inducing compressive stresses on the large faces. In conventional operation, where the slab is actively cooled during the lasing burst, the slab is cooler at the large pump faces than in the center, resulting in tensile stresses on these faces. Since dielectric materials are inherently several factors stronger in compression than in tension, this temperature reversal increases the inherent fracture limit of the system and allows a heat capacity operated laser to be pumped much harder than a conventionally operated slab laser. The amount of energy the laser can put out during operation is proportional to its mass, the heat capacity of the active medium material and the temperature difference over which it is being operated. The temperature swing that the laser medium goes through during the burst cycle is one of the key controlling parameters. By precooling the medium to cryogenic temperatures, e.g. liquid nitrogen temperature, it will be possible to double the temperature swing and therefore roughly double the output energy out of the same size laser where the active medium started at room temperature. By using a well known disk amplifier type architecture, this approach can yield hundreds of MegaJoules, with engagement times of the order of 10 sec.

DETAILED DESCRIPTION OF THE INVENTION

The invention is a method and the resulting apparatus for operating a solid state laser in the heat capacity mode. Laser operation is broken into two discrete and sequential operating steps. During the lasing step, the active medium is thermally well insulated and no cooling is present. As lasing proceeds, waste heat deposited within the active medium will heat it up until it reaches some maximum allowable temperature. In other words, during the lasing step, the laser operates in a thermal energy storage mode. Since the amount of energy that can be extracted from the laser is related to the thermal energy, the energy that can be extracted from the laser is therefore related to its mass, the heat capacity of the active medium and the temperature difference over which it is being operated.

In conventional steady-state solid state lasers, the inherent presence of temperature gradients causing tensile stresses on the outer surfaces (large pump faces in the case of slabs) is the mechanism that limits the average power potential of such devices. The surface stresses are important since defects such as scratches can lead to failure at stress levels well below the inherent mechanical strength. In heat capacity operation the inversion of the temperature distribution results in compressive stresses on the outer surfaces (large pump faces in the case of slabs). This temperature and thus stress reversal is important since the intrinsic fracture strength of dielectric materials is generally at least a factor of 5 greater in compression than in tension. This likewise holds for failure limits associated with surface defects. It is the combination of inverted temperature and stress distributions and the inherent increased strength under compression that allows for a much higher average power burst capability in a heat capacity operated laser than in classical average power devices where cooling occurs at the same time as lasing. This makes it possible to pump a solid state heat capacity laser far harder than a laser operating in a conventional actively cooled mode. It is this effect which is the source of the much higher average power burst capability compared to classical average power devices.

Figure 1:
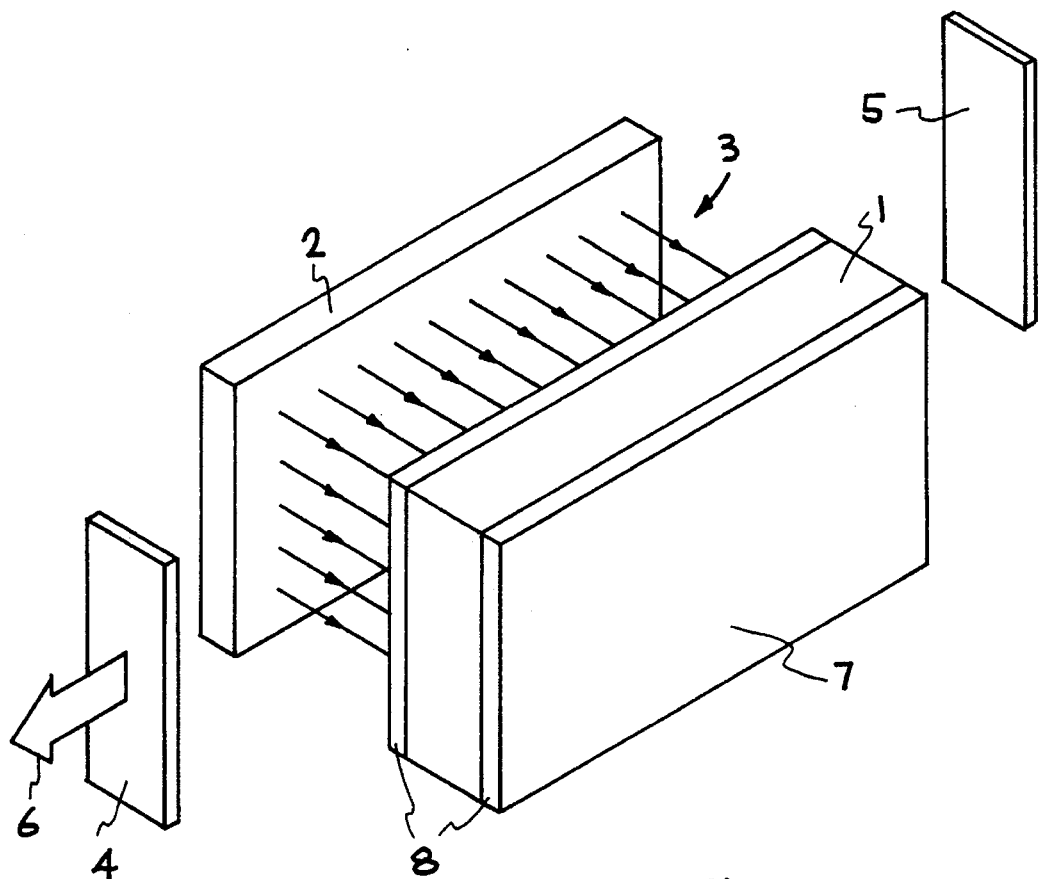
FIG. 1 shows a typical diode pumped solid state laser.
Figure 2:
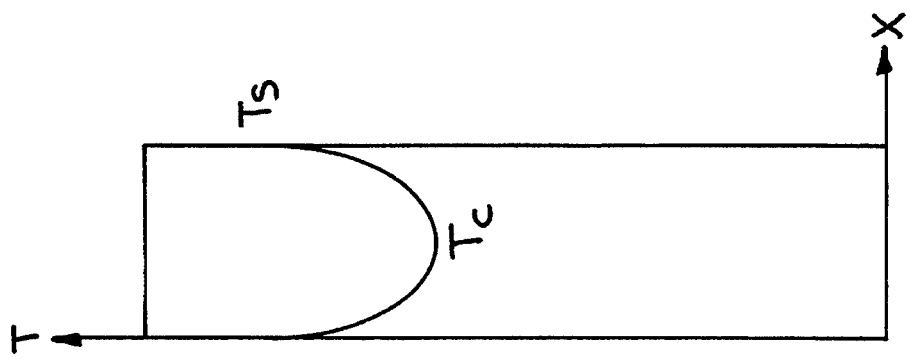
FIG. 2 shows the temperature gradients in a prior art solid state laser slab.
Figure 3A:
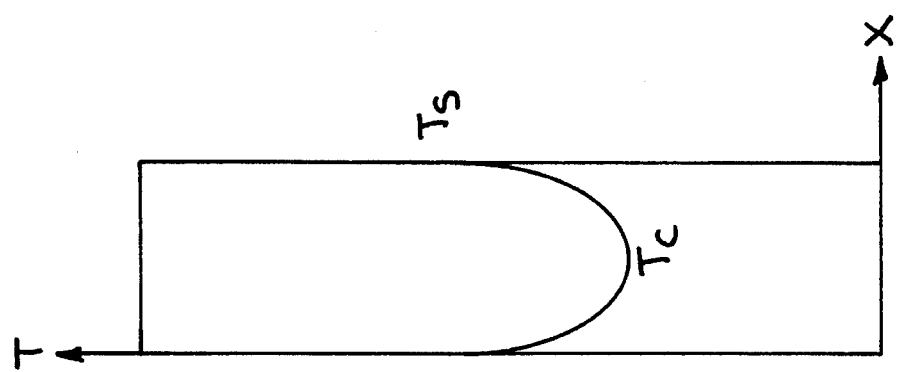
FIG. 3A shows the temperature gradients in a solid state laser slab operated in the heat capacity mode.
Figure 3B:
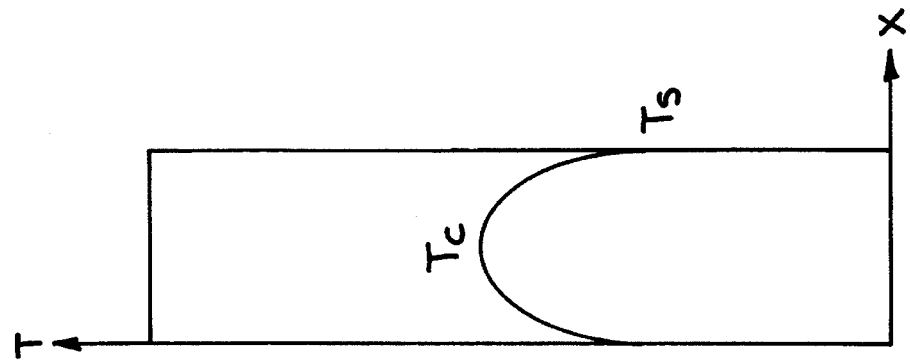
FIG. 3B shows the temperature gradient change at the end of lasing.

FIG. 1 shows a conventional diode pumped solid state laser which can be operated in the heat capacity mode according to the invention. Solid state active medium 1 comprises a slab; however, a rod or disk medium can also be used. Diode pump array 2 optically pumps light 3 into solid state active medium 1. Laser oscillation between high reflector 5 and output coupler 4 generates laser output 6. Cooling 7 such as liquid or gas can flow along the external wall of active medium 1 sandwiched between two flow windows 8 forming cooling channels. A model of this behavior shows, as an example, that a laser made of a 1×10×20 cm$^3$ slab of GGG (Gadolinium Gallium Garnet) should be capable of a 100 kJ burst of energy over a duration of around 10 sec. Energy bursts of this size for mobile units are completely out of reach of existing methods and approaches where the laser is actively cooled while laser extraction takes place. The above numbers assume a temperature swing of about 150° K. Temperature swings of as much as 200K can be achieved by pre-cooling the active medium using a cryogenic fluid. Increasing the temperature swing increases the energy out of the laser. FIG. 2 shows the temperature gradients in a prior art solid state laser slab. FIG. 3A shows the temperature gradients in a solid state laser slab operated in the heat capacity mode. FIG. 3B shows the temperature gradient change at the end of lasing.

The following design considerations provide operation of a solid state laser in the heat capacity mode.

1. The approximate amount of energy obtainable from the laser is determined by the classic heat capacity equation. It relates the caloric temperature increase dT in the solid state medium to the mass m, heat capacity $C_p$ and caloric heat energy $E_{heat}$, $$E_{heat} = mC_p dT. \qquad (1)$$

The heat capacity of the chosen medium is known, and is particularly large for solid state lasing media. The lower temperature limit is given by low temperature heat capacity effects, which are dependent on the laser medium selected. The upper temperature limit is given by level population redistribution effects, which differ from system to system. For $Nd^{3+}$ in a typical garnet, these limits are approximately 200° K. and 400° K., respectively. Hence it is the amount of heat energy released into the medium, which determines the required mass of the heat capacity solid state laser. For a given amount of lasing power, the fraction of heat released into the medium is particularly small for laser diode pumping. It is for this essential reason that heat capacity operation of solid state lasers only leads to desirable performance figures if diode pumping is employed, which thus becomes a key ingredient to a practical concept.

2. To relate the released heat energy $E_{heat}$ to the laser output energy $E_{out}$, consider that, as described above, the energy in the upper level, $E_{ul}$, is related through:

$$E_{out} = \epsilon_{extr} E_{ul}/(1+X) \qquad (2)$$

and $$E_{heat} = E_{ul} X/(1+X) \qquad (3)$$

so that:

$$E_{out} = (\epsilon_{extr}/X) E_{heat} = (\epsilon_{extr}/X) m C_p dT \qquad (4)$$

here X is the ratio of energy released as heat divided by the energy in the upper level as gain, and $\epsilon_{extr}$ is the extraction efficiency of the laser device. This last equation is the principle design equation for heat capacity lasers. The ratio $$FOM = (\epsilon_{extr}/X) C_p dT \qquad (5)$$

is a figure of merit (FOM) for heat capacity lasing materials and is equal to the output energy per kg of the ion/host combination considered. Typical $Nd^{3+}$ doped garnets have FOM values of about 500 J/g, rivaling the specific energy content of chemical fuels. This recognition is one of the key insights regarding heat capacity operated solid state lasers. Clearly, this also implies 1 MJ for a mere 2 kg of laser active mass, and the art of designing a specific system consists of distributing this mass in such a fashion that the applicable fundamental laser physics principles of pumping, extraction and so on allow the extraction of this energy in practice. It must be recognized, however, that the principle of heat capacity operation applies to all solid state medium geometries (rod, slab, disk) as well as all formats of extraction (free lasing, Q-switching, mode locking and so on).

3. The second key feature of heat capacity operation is the phenomenon of stress reversal in heat capacity operated lasers, as it directly bears upon the time interval within which the laser energy described above can be extracted from the system. As described earlier, the absence of cooling during the lasing cycle leads to a temperature profile with the highest temperature on the disk surface, and as shown in FIGS. 3A–B, the lowest temperature in the center of the lasing material, thus inverting the stress profile from that found in the conventional steady state operation of a simultaneously lased and cooled solid state laser. The conventional steady state tensile surface stress of a simultaneously lased and cooled slab of thickness t is given by:

$$\sigma_{CW} = \left(\frac{1}{12}\right)\left(\frac{\alpha' E}{(1-\upsilon)k}\right)\left(\frac{PX\beta t}{X+1}\right) \qquad (6)$$

where P is the power in W/cm$^2$ of the incident pump irradiance, β is the fraction of that irradiance that is absorbed, X is the ratio of heat to inversion energy, υ is the Poisson ratio, E is Young's modulus of elasticity, k is the thermal conductivity, and α' is the thermal expansion coefficient. The thermo-mechanically weakest region of a heat capacity operated slab is in the center of the perimeter, where the tensile stress in the slab center appears at the surface. For a heat capacity operated slab this tensile stress on the perimeter is given as $$\sigma_{Heatcap} = \frac{6(1-v)}{\pi^2} \sigma_{CW} f(\alpha t, D_{th}, \tau) \qquad (7)$$

where f ($\alpha t$, $D_{th}$, $\tau$) is a non-dimensional function of the pump light absorption coefficient α the slab thickness t, the thermal diffusivity $D_{th}$, and the laser burst time τ. For both cases, the stress must not exceed a critical fracture stress, which is a function of the details of surface finish. Comparing expressions (6) and (7), (7) expresses the tensile stress normalized to the tensile stress encountered in a steady state cooled slab. The character of the function f ($\alpha t$, $D_{th}$, $\tau$) is such that $\sigma_{Heatcap}$ is generally small compared to $\sigma_{CW}$ for practically occurring values of αt.

As equation (7) shows, a small X parameter is again essential to heat capacity operation. This, combined with the power burst capability accessable through it, requires high repetition rate laser diode pumping. At the present time, even leading technology diode lasers cannot deliver pump irradiances, as allowed by equation (7), that would approach the critical tensile failure stress for most crystalline media, and many glass media. As a consequence, fracture considerations are of little consequence during lasing for most applications, making present technology capable of supporting MJ heat capacity lasers with burst times of seconds, as described below.

The method of operating a diode pumped solid state laser in the heat capacity regime comprises optically pumping a solid state laser gain medium for a pumping period of time determined by $$\tau = \frac{(\epsilon_{extr}/X) m C_p dT}{P_{out}},$$

where m is laser gain medium mass, $C_p$ is the specific heat, dT is the bulk temperature change during the heat capacity sequence, $P_{out}$ is a desired output power of the laser, $\epsilon_{extr}$ is extraction efficiency and X is the heat energy to gain energy ratio. This method can include cooling the gain medium for a cooling period of time determined by $$p = \frac{m C_p dT}{Q_{cool}},$$

where $Q_{cool}$ is the average cooling rate that is limited by fracture considerations. The cooling period of time is initiated after the pumping period of time. The pumping step followed by the cooling step comprises a cycle.

The above describes the key elements and concepts for heat capacity operated solid state lasers. Given the low specific waste heat value for laser diode pumping, the specific output energy [J/g] of heat capacity solid state lasers approaches the specific energy content of chemical fuels, allowing MJ of energy to be extracted from Kg of material. Heat capacity, rather than steady state operation, of the lasing medium allows energy bursts far in excess of what is feasible under steady state conditions. Diode pumping is necessary to achieve these capabilities in practice.

The following describes a specific embodiment with a burst capacity of 1 MJ, of a 300 kW heat capacity solid state laser having a burst duration of 3 seconds.

Figure 4:
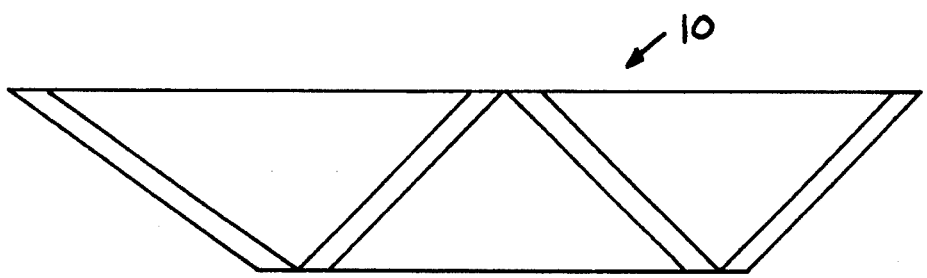
FIG. 4 shows a disk amplifier.

The essential architecture is that of a disk amplifier 10, wherein in FIG. 4, employed as a power oscillator, although conventional oscillator-amplifier architectures are equally viable. It is equally useful to consider glass or crystals for the active medium, depending on the detailed design tradeoffs demanded by the specific application.

For this embodiment, the 1 MJ heat capacity oscillator has 22 disks, each ¾ cm thick, which are 10 cm by 20 cm, made from GGG and arranged at alternate Brewster's angle. The diode pump arrays are capable of 1 kW/cm² peak emitted irradiance, and during the power burst are operated at 700 Hz and 25% duty cycle. Unlike in conventional disk amplifiers, the disks are sandwiched between two flow windows so that cooling channels are formed for the flow of a low temperature gas. Before the power burst, the laser is precooled to about 200° K. Then, the diode pump arrays are activated as described (700 Hz, 25% duty cycle). During this burst the temperature rises from the initial 200° K. to a final temperature of up to 400° K. at a rate of approximately 70° K./sec. Previous experiments will have established the allowable number of shots at a given diode array pump current, or an appropriately placed temperature sensing element will shut the laser down once the maximum allowable temperature has been reached. The above calculations show that the laser is capable of outputting 300 kW of average power for three seconds, for a total burst energy of 1 MJ. By changing system parameters like disk size, disk number, and a reasonable increase in the capability of the diode pump array, systems with up to 4 MW of burst power for a two second duration are achievable.

As has been indicated above, the concept of solid state heat capacity lasers is not limited to either an active medium architecture, or a specific system architecture. Rod lasers can be operated as heat capacity lasers, although the appearance of radial index and stress gradients, which will increase with center to edge temperature difference, makes this architecture of limited use. A zigzag architecture has the well known property to average out index gradients through the slab thickness, making it a more desirable active medium for heat capacity operation. Just like for single shot applications, the multi-aperture disk amplifier is the ultimate architecture to scale towards near unlimited power and energy. The same is true if the active medium is operated in heat capacity mode, and the 1 MJ system outlined above is a case in point. The method does not depend on what active medium is used or in which pulse format (Q-switched mode-locked, cavity dumped, free-running or continuous-wave) the laser is operated.

There are a variety of other advantages which come with heat capacity operation. The thermal gradients implicit in steady state operation cause gradients in the refractive index and deformations of the active medium surfaces which are detrimental in achieving a good quality extraction beam. Numerous military and civilian applications require good beam quality, either to achieve propagation over great distances, or to reduce the focused spot size in e.g. a metal working application. A heat capacity operated solid state laser inherently greatly reduces these gradients. Thus the reduction of thermal gradients in the active medium is intrinsically more conducive to achieving good beam quality at high energy outputs. This advantage, together with the well established advantages of graded reflectivity unstable resonators will make possible output beams of good quality. Furthermore, the temporal scale of seconds makes the application of deformable resonator mirrors for beam quality correction a very attractive option. Add to this the large energy burst capacity, and one has the ideal means to propagate large energy pulses over very long distances. The absence of a steady state cooling device for the active medium greatly facilitates construction of airborne or otherwise mobile laser systems of considerable power. Generally, the necessity to include steady state refrigeration, particularly in airborne systems, represents a considerable penalty on important system characteristics like weight and power consumption, and severely limits the amount of available laser energy such a system can carry. At some point the laser needs to be cooled down again. For many military scenarios the time between engagements is easily long enough to accomplish this with a stream of outside air, or other means.

For other applications, more aggressive cooling is possible employing high velocity gas or two phase mixture streams. The same principles hold for industrial applications. There are a variety of other advantages which are implicit in heat capacity limited operation. The harder pumping provided by a heat capacity operated laser facilitates the achievement of peak powers with which efficient nonlinear frequency conversion of the laser output becomes possible. Steady state average power lasers, even when mode-locked, have peak powers which are much too low to exhibit frequency conversion efficiencies of more than a few per cent.

Some of the military applications made possible by this invention range from long distance (hundreds of km) designators/illuminators to anti-missile applications and, once non-linear frequency conversion is added, anti-sensor applications as well. Industrial applications will be found as well, but are at this point unknown, since energy bursts of this magnitude have so far been entirely out of reach. It can reasonably be expected that new material working applications will be found which are only possible with pulses of the type delivered by a heat capacity operated laser. Paint removal from high value surfaces (airplanes) is one application in which the military and civilian sector will have an equal interest.

Changes and modifications in the specifically described embodiments can be carried out without departing from the scope of the invention, which is intended to be limited by the scope of the appended claims.

What is claimed is:

1. A method of operating a diode pumped solid state laser in the heat capacity regime, comprising optically pumping a solid state laser gain medium for a pumping period of time determined by $$\tau = \frac{(\epsilon_{extr}/X)mC_pdT}{P_{out}},$$

where m is laser gain medium mass, $C_p$ is the specific heat, dT is the bulk temperature change during the heat capacity sequence, $P_{out}$ is a desired output power of said laser, $\epsilon_{extr}$ is extraction efficiency and X is the heat energy to gain energy ratio, further comprising cooling said gain medium for a cooling period of time determined by $$p = \frac{mC_pdT}{Q_{cool}},$$

said cooling period of time initiating after said pumping period of time, wherein said pumping step followed by said cooling step comprises a cycle, where $Q_{cool}$ is the average cooling rate, wherein said cooling step includes flowing coolant through two flow windows sandwiching said gain medium, wherein said windows form cooling channels.

2. The method of claim 1, wherein said cycle is repeated at least once.

3. The method of claim 1, further comprising the step of pre-cooling said gain medium prior to said pumping step.

4. The method of claim 3, wherein said pre-cooling step is carried out with a gas.

5. The method of claim 1, wherein said pumping step includes optically pumping said solid state laser medium with at least one laser diode array.

6. The method of claim 1, wherein the step of optically pumping includes optically pumping said gain medium having a mass $$m = \frac{E_{out}}{(\epsilon_{extr}/X)C_pdT},$$

where $E_{out}$ is a desired output energy of said laser.

7. The method of claim 1, wherein the step of optically pumping includes optically pumping said gain medium selected from a group consisting of a rod, a slab and a disk.

8. The method of claim 1, wherein said cooling step includes cooling said gain medium with a gas.

9. The method of claim 1, wherein said cooling step includes cooling said gain medium with a liquid.

10. The method of claim 1, wherein the step of optically pumping includes optically pumping a plurality of discs, each disc of said plurality of discs positioned at alternating Brewster's angle with respect to an adjacent disc.

11. The method of claim 1, wherein the step of optically pumping includes optically pumping Nd:Gadolinium-Gallium-Garnet.

12. A method of operating a diode pumped solid state laser in the heat capacity regime, comprising optically pumping a solid state laser gain medium for a pumping period of time determined by $$\tau = \frac{(\epsilon_{extr}/X)mC_pdT}{P_{out}},$$

where m is laser gain medium mass, $C_p$ is the specific heat, dT is the bulk temperature change during the heat capacity sequence, $P_{out}$ is a desired output power of said laser, $\epsilon_{extr}$ is extraction efficiency and X is the heat energy to gain energy ratio, further comprising the step of precooling said gain medium to a temperature below room temperature prior to said optically pumping step.

13. The method of claim 1, wherein the step of optically pumping includes optically pumping said gain medium operated in a pulse format selected from a group consisting of Q-switched, mode-locked, cavity dumped, free-running and continuous-wave.

14. The method of claim 1, wherein the gain medium has a mass determined by
where m is the laser gain medium mass, $C_p$ is the specific heat, dT is the bulk temperature change during the heat capacity sequence, $E_{out}$ is the desired output energy of said laser, $\epsilon_{extr}$ is extraction efficiency and X is the heat energy to gain energy ratio.

$$m = \frac{E_{out}}{(\epsilon_{extr}/X)C_pdT}$$

* * * * *